(12) United States Patent
Caval

(10) Patent No.: US 11,028,599 B2
(45) Date of Patent: Jun. 8, 2021

(54) ARTIFICIAL STONE CONSTRUCTION MATERIAL AND METHOD OF MAKING

(71) Applicant: Jacob Caval, Twin Falls, ID (US)

(72) Inventor: Jacob Caval, Twin Falls, ID (US)

(*) Notice: Subject to any disclaimer, the term of this patent is extended or adjusted under 35 U.S.C. 154(b) by 50 days.

(21) Appl. No.: 16/212,243

(22) Filed: Dec. 6, 2018

(65) Prior Publication Data
US 2019/0106886 A1   Apr. 11, 2019

Related U.S. Application Data

(62) Division of application No. 15/063,281, filed on Mar. 7, 2016, now Pat. No. 10,161,138.
(Continued)

(51) Int. Cl.
*E04F 13/14* (2006.01)
*E04F 13/08* (2006.01)
(Continued)

(52) U.S. Cl.
CPC ............ *E04F 13/147* (2013.01); *B28B 1/005* (2013.01); *B28B 23/02* (2013.01); *B29C 39/00* (2013.01);
(Continued)

(58) Field of Classification Search
CPC ..... Y10T 428/12361; Y10T 428/12493; Y10T 428/12535; Y10T 428/12542; Y10T 428/12549; Y10T 428/12597; Y10T 428/12611; Y10T 428/12618; Y10T 428/12736; Y10T 428/25; Y10T 428/252; Y10T 428/254; Y10T 428/256; Y10T 428/257; Y10T 428/258; Y10T 428/259; Y10T 428/31678; Y10T 428/24273; Y10T 428/24298; Y10T 428/24306; Y10T 428/24314; Y10T 428/24322; Y10T 428/24331; Y10T 428/4935; Y10S 428/9044; B32B 3/00; B32B 3/24; B32B 3/26; B32B 3/266; B32B 5/00; B32B 5/02; B32B 5/028; B32B 5/16; B32B 5/22;
(Continued)

(56) References Cited

U.S. PATENT DOCUMENTS 4,183,188 A * 1/1980 Goldsby ............... B28B 1/16
106/660
5,927,034 A 7/1999 Cole
(Continued)

FOREIGN PATENT DOCUMENTS

CN  104110092 A  10/2014
EP  0274556 A1   7/1988

OTHER PUBLICATIONS

US Patent and Trademark Office; Office Action for U.S. Appl. No. 15/063,281, dated Mar. 16, 2018.

*Primary Examiner* — Maria V Ewald
*Assistant Examiner* — Ethan A. Utt
(74) *Attorney, Agent, or Firm* — Parsons Behle & Latimer

(57) ABSTRACT

An artificial stone building tile and method. Disclosed is an artificial stone building tile and a method of making the building tile. The building tile has a low density and significant flexibility, and is nailable without cracking. It is made by layers of cement formulations separated by layers of metal mesh. Color batches of cement are prepared and placed in the bottom of a mold, with the color batches becoming the visible face of the building tile.

19 Claims, 5 Drawing Sheets

Related U.S. Application Data

(60) Provisional application No. 62/129,620, filed on Mar. 6, 2015.

(51) Int. Cl.

| | |
|---|---|
| *C04B 28/04* | (2006.01) |
| *B32B 3/26* | (2006.01) |
| *B32B 13/06* | (2006.01) |
| *B32B 15/02* | (2006.01) |
| *B32B 13/02* | (2006.01) |
| *C04B 111/00* | (2006.01) |
| *C04B 111/30* | (2006.01) |
| *C04B 111/54* | (2006.01) |
| *C04B 111/80* | (2006.01) |
| *B28B 1/00* | (2006.01) |
| *B28B 23/02* | (2006.01) |
| *B29C 39/00* | (2006.01) |
| *B28B 1/16* | (2006.01) |

(52) U.S. Cl.
CPC .......... *C04B 28/04* (2013.01); *E04F 13/0837* (2013.01); *E04F 13/141* (2013.01); *B28B 1/16* (2013.01); *B32B 3/266* (2013.01); *B32B 13/02* (2013.01); *B32B 13/06* (2013.01); *B32B 15/02* (2013.01); *B32B 2419/04* (2013.01); *C04B 2111/00612* (2013.01); *C04B 2111/30* (2013.01); *C04B 2111/54* (2013.01); *C04B 2111/802* (2013.01)

(58) Field of Classification Search
CPC .. B32B 5/24; B32B 5/30; B32B 13/00; B32B 13/02; B32B 13/04; B32B 13/047; B32B 13/06; B32B 13/14; B32B 15/00; B32B 15/02; B32B 15/04; B32B 15/16; B32B 15/20; B32B 9/00; B32B 9/002; B32B 9/04; B32B 9/041; B32B 9/047; B32B 9/048; B32B 2250/42; B32B 2305/38; B32B 2307/402; B32B 2307/4026; B32B 2419/00; B32B 2419/04; B32B 2607/00; B32B 2607/02; C04B 14/00; C04B 14/04; C04B 14/048; C04B 14/06; C04B 14/14; C04B 14/16; C04B 14/26; C04B 14/28; C04B 14/285; C04B 16/00; C04B 26/00; C04B 28/00; C04B 2103/54; E04B 1/00; E04B 1/02; E04B 1/04; E04B 1/08; E04B 1/14; E04B 2/00; E04B 2/02; E04B 2/72; E04B 5/00; E04B 5/02; E04B 5/023; E04B 5/04; E04B 5/08; E04B 5/44; E04B 2103/00; E04B 2103/02; E04B 2103/06; E04C 2/00; E04C 2/02; E04C 2/04; E04C 2/041; E04C 2/043; E04C 2/044; E04C 2/06; E04C 2/08; E04C 2/26; E04C 2/28; E04C 2/44; E04C 2/46; E04C 2/50; E04C 2002/005; E04C 2002/008; E04F 13/00; E04F 13/07; E04F 13/072; E04F 13/073; E04F 13/0736; E04F 13/077; E04F 13/078; E04F 13/08; E04F 13/0866; E04F 13/0885; E04F 13/0887; E04F 13/12; E04F 13/123; E04F 13/14; E04F 13/141; E04F 13/142; E04F 13/144; E04F 13/147; E04F 15/00; E04F 15/02; E04F 15/0215; E04F 15/02155; E04F 15/022; E04F 15/06; E04F 15/08; E04F 15/082; B44C 5/00; B44C 5/04; B44C 5/0415; B44C 5/0438; B44C 5/0453; B44C 5/0461; B44F 9/00; B44F 9/02

USPC ....... 428/596, 615, 621–623, 630, 632, 633, 428/650, 131, 134–138, 323, 325, 428/327–331, 457, 469, 471–472.3, 688, 428/689, 697, 699, 701–703, 540, 426, 428/432, 433, 446, 448, 450, 542.2, 428/542.6, 904.4; 106/400–506, 819; 52/506.01, 506.06, 511–513, 596, 600, 52/612, 782.1, 783.1, 791.1, 309.1–309.3, 52/309.13–309.17

See application file for complete search history.

(56) References Cited

U.S. PATENT DOCUMENTS

| | | |
|---|---|---|
| 6,790,276 B1 | 9/2004 | Caval |
| 8,387,323 B2 | 3/2013 | Mickelson |
| 8,636,842 B2 | 1/2014 | Park |
| 2007/0003791 A1* | 1/2007 | Rochette ............ B44C 5/04 428/703 |
| 2010/0005743 A1* | 1/2010 | Anderson ............ B44F 9/04 52/314 |
| 2013/0071633 A1* | 3/2013 | Aravamudan ......... B32B 5/18 428/196 |

* cited by examiner

ARTIFICIAL STONE CONSTRUCTION MATERIAL AND METHOD OF MAKING

PRIORITY/CROSS-REFERENCE TO RELATED APPLICATIONS

This application is a divisional of U.S. patent application Ser. No. 15/063,281 filed Mar. 7, 2016 entitled "Artificial Stone Construction Material and Method of Making," which claims the benefit of U.S. Provisional Application No. 62/129,620, filed Mar. 6, 2015, entitled "Artificial Stone Construction Material and Method of Making," the disclosures of which are incorporated by reference herein in their entireties.

TECHNICAL FIELD

The presently disclosed technology relates to building materials in general and more specifically to an artificial stone material and a method of making it.

BACKGROUND

It is desirable in building materials to have a wall covering or tile which has the appearance of stone. Stone is an attractive and durable material but is expensive to cut, heavy to transport, and difficult to install. Part of the problem with installation is that it is held up typically by adhesive, and the adhesive may not be strong enough to hold the stone tile in place, especially in the case of earthquake or tremors. Stone cannot be nailed in place, and drilling a hole for a mounting screw is expensive.

It is desirable to have a building material in the form of a slab or a tile which has the appearance of stone, but which is lighter than stone, easier to install and has more flexibility than stone.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

The disclosed technology is a method for making an artificial stone building tile, and it is also the stone building tile of the composition and structure defined in the claims and in this disclosure. The method of making the artificial stone building tile results in a lightweight tile or slab which has the appearance of artificial stone and which has other characteristics which are highly desirable in a building material. Slab, tile and trim piece will be referred to interchangeably. The artificial stone building tile has a certain amount of flexibility, and a four foot long slab of this building material has a flex of at least 1¼ inches to 1½ inches. It is also fairly light, having a density of four pounds per square foot. This density is highly desirable compared to other building materials which might be used in the same situation. For instance, stucco which has a density of ten pounds per square foot, marble which has a density of seven pounds per square foot, sheetrock which has a density of 2.2 pounds per square foot. Granite of a similar thickness (½ inch) has a density of 6.5 pounds per square foot.

The first step of the method is to place a mold on a flat working surface. The working surface can be a floor or a table or something horizontal. The mold will vary depending on the size of the tile to be made, but as an example, an artificial stone building tile of 24 inches by 96 inches, ½ inch thick will be described. The mold will be 24 inches by 96 inches and have side walls approximately 1 inch tall, and a bottom, but not a top. The mold is preferably made of wood, rubber, plastic or other material selected for its ability to easily release the tile from the mold, but other materials which have a similar releaseability from the tile are also suitable.

With the mold placed on a horizontal surface, one or more color pastes are mixed up to a consistency of yogurt. The color pastes are made up of stone powder, cement, water, pigment, and a glue. The stone powder can be made from any type of stone: marble, granite, pumice, quartz, or chalk. Other stone powders are also suitable for this composition. The cement is preferably white cement as exemplified by Lehigh brand. The pigment is a water soluble pigment and can be selected to simulate many different stone surfaces, and therefore batches can be made up having many different colors. Typically a number of color mixes will be prepared and placed side-by-side without intermixing in the bottom of the mold. Pigments such as those sold as Levanile Company and made for use in cement are suitable. The stone powder is preferably ultrafine in size and less than 200 mesh.

The color pastes are made of different batches of color, and added together onto the bottom of the mold with possible swirling or intermixing or the option of keeping some or all of the colors separate. The particular mix of ingredients would typically be:

45 pounds of ounces of stone powder 25 pounds of mixture of white Portland cement plus metakaolin (up to 10% of the cement by weight)

Sufficient water to bring mixture to the consistency of yogurt, roughly 1100 cp 5 ounces or more of pigment, highly variable depending on the color being achieved One gallon of "glue"

The glue is for the purpose of adding to bond strength, and a suitable glue is Concrete Bonder and fortifier made by Sakrete.

The Metakaolin is exemplified by a product made by Advance Cement Technologies, and is an optional ingredient. More metakaolin is used in a mix if additional bonding and strength is desired.

Once each of the color pastes are mixed up, they are added to the bottom of the mold with possible swirling together or retained in color regions that are kept separate, depending on the appearance of the stone that is desired.

The next step of the method is placing a layer of metal mesh on top of the color layer in the mold. The metal mesh is sized to substantially fill the mold from side to side. At this point the color layer would still be liquid, in about the consistency of yogurt, and the layer of metal mesh would be placed lightly on top so that it does not press through the color layer to the bottom of the mold. Whatever is on the bottom of the mold will become the side of the tile which is visible once it is placed on a wall.

The preferred metal mesh is an expanded sheet of aluminum that has diamond shaped holes which are approximately ¼ inch from side to side. This provides some reinforcement between the layers and gives the tile rigidity yet retaining flexibility. Other types of mesh could also be used such as woven metal mesh.

The next step is mixing a backing layer which is made up of stone powder, cement, and water, and may optionally also contain pigment. The backing layer is also mixed to the consistency approximately of yogurt, which is defined as approximately 1100 cp, and the same mix of cement, stone powder, pigment (optional) and glue and water are used. In the backing layer the stone powder is made up of about 50:50 fine powder and larger particles of up to ⅛ inch in size.

The first backing layer may have larger pieces of stone in it, such as ⅛ inch. Additional backing layers may be used, and each backing layer would have larger stones mixed with stone powder. A second backing layer would typically have stone particles of ¼ inch, a third backing layer would have stone particles of ⅜ inch, and a fourth backing layer would have stone particles of ½ inch. The first backing layer is added on top of the metal mesh layer, and the presence of the metal mesh layer between the color layer and the backing layer prevents the two layers from freely intermixing. Thus the color layer will not be disturbed by or blended into the backing layer. The two layers in the metal mesh are allowed to dry in the mold for approximately 24-48 hours, at which time the artificial stone tile may be removed from the mold by turning the mold upside down and applying a minimal amount of impact.

The preferred thickness of the color layer is approximately ¼ inch thick, which is the same preferred thickness as the thickness of the backing layer. Additional layers can be added by adding a second metal mesh layer on top of the backing layer, and adding a second backing layer on top of the second metal mesh layer. In this way, slabs or tiles can be ½ inch, ¾ inch, 1 inch, 1¼ inch, etc. up to whatever thickness is desired. The ½ half inch thick slab would have three layers: color, metal mesh, and backing. The ¾ inch thick slab would have five layers, to the half inch thick slab would be added a second metal mesh layer and a second ¼ inch backing layer. In this way increments of ¼ inch can easily be added, and retain the flexibility of the ½ inch slab as well as lightweight and nailability. When cured, the stone slab thus created may be polished with sandpaper to have a smooth and hard surface, similar to marble in hardness and appearance.

A big advantage to this building material is that adhesive may be placed on a vertical wall, and the building material can be placed on the adhesive. The problem with leaving it at this step is that a stone slab would tend to slide down the wall or fall off of the adhesive. This is solved in this building material by the building material being of a lighter weight for one, and less likely to slide down the adhesive, and a very minimal amount of nailing can used to secure the building material against the wall until the adhesive cures. Nailing would typically be by a finished nail which has a very small or no head, this can be nailed into and through the tile of the disclosed technology, and a very few nails can secure the tile onto the wall until the adhesive cures. The nail heads will be very minimal and inconspicuous and can be covered by a colored paste so that they are invisible.

Besides being attachable to a vertical wall, the slab thus made be used in a horizontal application, such as a counter top or as floor tile.

The technology also involves the artificial stone building tile made from the method described above. The building tile has a colored layer made up of at least one colored cement mix, with the color layer of stone powder, cement, pigment and glue. Adjacent to the color layer is a metal mesh layer which is formed in the tile while the color layer and the backing layer are liquid. The backing layer is adjacent to the metal mesh layer and is embedded around the metal mesh layer. The color layer of the artificial building tile is made up of the mix as described in the method above. The stone powder used in creating the artificial building stone can be selected from marble powder, granite powder, pumice powder, quartz powder, chalk or other stone powder or powders. The artificial stone building tile can also have multiple layers, with each layer adding a layer of metal mesh and an additional backing layer.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE PREFERRED EMBODIMENTS

Figure 1:
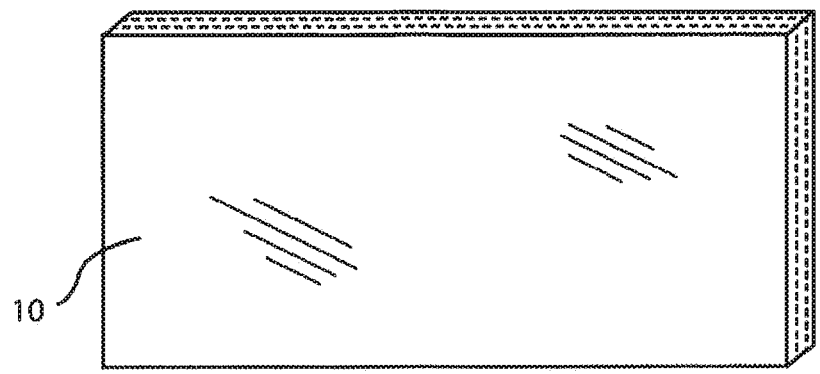
FIG. 1 is a perspective view of an artificial stone building tile of the disclosed technology.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

FIG. 1 shows an example of an artificial stone tile or slab made according to the technology defined in the claims and the disclosure. Shown in FIG. 1 is an artificial stone building tile 10 made according to the disclosed technology. This particular building tile is an example of a typical dimension that might be made, which could be 2 feet by 4 feet and ½ inch thick. Other dimensions are possible, such as 24 inches by 24 inches and up to 4 feet by 8 feet by 1.2 inch thick. The ability to make this slab this large, and this thin, makes this method and slab unlike any other. When finished slab is hard enough to be polished to a finish like polished stone, and it can be nailed without cracking, and has a good deal of flexibility. It is far lighter than real stone.

Figure 2:
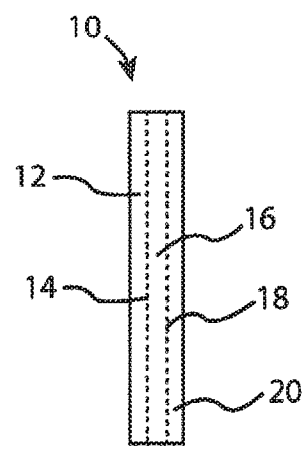
FIG. 2 an end view perspective view of an artificial stone building tile of the disclosed technology.

FIG. 2 is an end view of one type of construction slab according to the present technology. FIG. 2 shows a color layer 12 adjacent to a layer of metal mesh 14 beyond which is a first backing layer 16. The tile formed in FIG. 2 also has a second layer of metal mesh 18 and a second backing layer 20.

Figure 3:
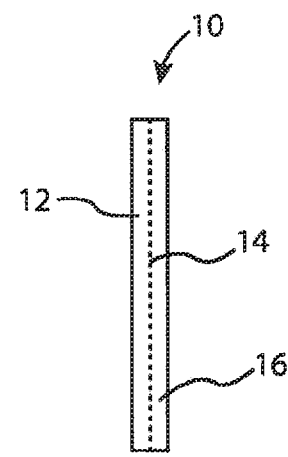
FIG. 3 an end view perspective view of an artificial stone building tile of the disclosed technology.

The version of the building tile shown in FIG. 3 has a color layer 12 and metal mesh layer 14 and a backing layer 16. If these layers are ¼ inch in depth, the tile shown in FIG. 3 would be approximately ½ inch in thickness. The tile shown in FIG. 2 would be approximately ¾ inch in thickness.

Figure 4:
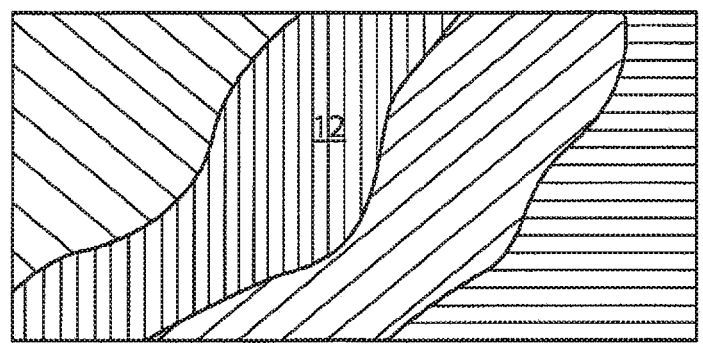
FIG. 4 is a plan view of the outer surface of the artificial stone building tile of the disclosed technology.

FIG. 4 shows one possible configuration of the color layer 12. In this configuration four different batches of colored cement mix have been applied and are presented in discreet sections in the color layer. For instance one color could be shade of green, another color could be a shade of gray, another color could have elements of red in it and another color could have elements of yellow in it. These would be formulated to achieve the desired appearance of artificial stone. The different colored cement mixes can be placed in discreet regions as shown in FIG. 4, or they can be blended together according to whatever style of artificial stone is desired.

Figure 5:
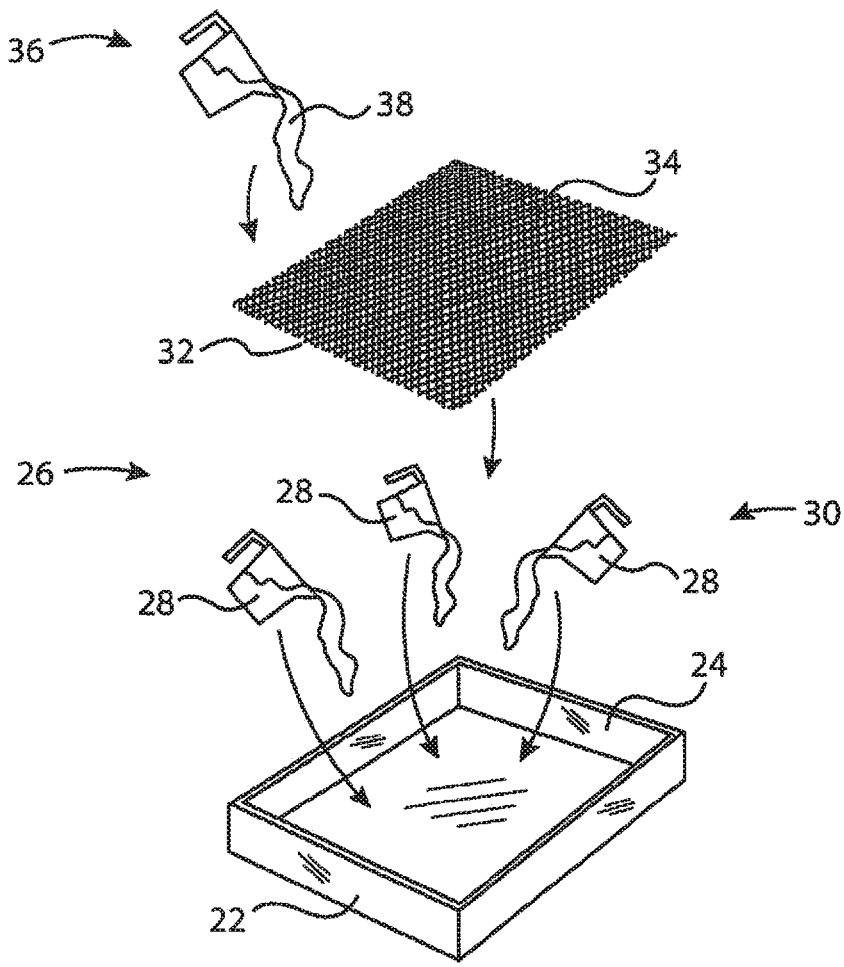
FIG. 5 is a perspective view showing several steps of the method of making the artificial stone building tile of the disclosed technology.

FIG. 5 shows several steps of the method of making the artificial stone disclosed in the claims and disclosure. Shown is a mold 22, which could be sized according to the desired size of the tile being made. For instance, it could be 2 feet by 4 feet for a ratio as shown in FIG. 1, or it could be 24 inches by 24 inches, or any other dimensions that the tile is desired to formed in. The mold 22 is a four sided structure which has four side walls 24 and a bottom 25. Side walls 24 would typically be approximately 1 inch in height. The mold 22 is preferably made of plastic or other materials which have a similar rigidity and releasability of the tile which is formed therein. Shown in FIG. 5 is a step 26 in which one or more color pastes 28 are prepared and added to the mold 22. The color pastes are made up of stone powder, a mixture of cement and metakaolin, water, pigment, and glue. The stone powder is made up of particles with a mesh size less than 200 mesh.

The particular mix of ingredients for the color layer would typically be:

45 pounds of ounces of stone powder, 25 pounds of mixture of white Portland cement plus metakaolin (up to 10% of the cement by weight). The metakaolin is exemplified by the product from Advance Cement Technologies, and is an optional ingredient. More metakaolin is used in a mix if more strength in the product is desired.

Sufficient water to bring mixture to the consistency of yogurt, roughly 1100 cp 5 oz or more of pigment, highly variable depending on the color being achieved.

One gallon of "glue."

The glue is for the purpose of adding to bond strength, and a suitable glue is Concrete Bonder and Fortifier made by Sakrete. Additional glue is added as an additive to concrete mix to increase its adhesion, impact strength and abrasion resistance.

A workable range of the ratios of these ingredients would be 40-50 lbs of stone power, 20-30 lbs of cement plus metakaolin mix, water and pigment to desired consistency and color, and 3-5 quarts of glue.

Once each of the color pastes are mixed up they are added to the bottom of the mold with possible swirling together or retained in color regions that are kept separate, depending on the appearance of the stone that is desired.

The next step of the method is shown as 32, placing a layer of metal mesh 34 on top of the color layer in the mold 22. The metal mesh is sized to substantially fill the mold from side to side. At this point the color layer would still be liquid, in about the consistency of yogurt, and the layer of metal mesh would be placed lightly on top so that it does not press through the color layer to the bottom of the mold. Whatever is on the bottom of the mold will become the side of the tile which is visible once it is placed on a wall. The visible side is designated 44.

The preferred metal mesh 34 is an expanded sheet of aluminum that has diamond shaped holes which are approximately ¼ inch from side to side. This provides reinforcement between the layers and gives the tile rigidity yet retaining flexibility and resisting cracking. Other types of mesh could also be used such as woven metal mesh.

The next step is shown as 36, and is mixing a first backing layer 16 which is made up of stone powder and granules, cement, and water, and may optionally also contain pigment. The backing layer is also mixed to the consistency approximately of yogurt, which is defined as approximately 1100 cp, and the same mix of cement, stone powder, pigment (optional) and glue and water are used. In the backing layer the stone powder material is made up of about 50:50 fine powder and larger particles, up to ⅛ inch in size.

Additional backing layers may be used, and each backing layer would have larger stones mixed with stone powder. A second backing layer 20 would typically have stone particles of ¼", a third backing layer would have stone particles of ⅜ inch, and a fourth backing layer would have stone particles of ½ inch. The first backing layer is added on top of the metal mesh layer, and the presence of the metal mesh layer between the color layer and the backing layer prevents the two layers from freely intermixing. Thus the color layer will not be disturbed by or blended into the backing layer. The two layers in the metal mesh are allowed to dry in the mold for approximately 24-48 hours, at which time the artificial stone tile may be removed from the mold by turning the mold upside down and applying a minimal amount of impact.

The preferred thickness of the color layer is approximately ¼ inch thick, which is the same preferred thickness as the thickness of the backing layer. Additional layers can be added by adding a second metal mesh layer on top of the backing layer, and adding a second backing layer on top of the second metal mesh layer. In this way, slabs or tiles can be ½ inch, ¾ inch, 1 inch, 1¼ inch, etc. up to whatever thickness is desired. The ½ half inch thick slab would have three layers: color, metal mesh, and backing. The ¾ inch thick slab would have five layers, to the half inch thick slab would be added a second metal mesh layer and a second ¼ inch backing layer. In this way increments of ¼ inch can easily be added, and retain the flexibility of the ½ inch slab as well as lightweight and nailability. When cured, the stone slab thus created may be polished with sandpaper to have a smooth and hard surface, similar to marble in hardness and appearance.

FIG. 5 also shows the step of adding at least one color paste to form a color layer on the bottom of the mold at 30. Also shown is the step 32 in which a metal mesh 34 is added to the mold on top of the color layer 12 on the bottom of the mold. The metal mesh serves to prevent mixing of the color layer with subsequent layers of backing layers, and adds a flexible reinforcement. The metal mesh layer 34 is made up of a sheet of metal mesh sized to fit wall to wall with the sidewalls of the mold 22. A preferred metal mesh is expanded aluminum which is cut to fit the dimensions of the mold 22. Shown in FIG. 5 is the step of adding the backing layer 36 at step 38 to the mold on top of the metal mesh layer 34.

Figure 6:
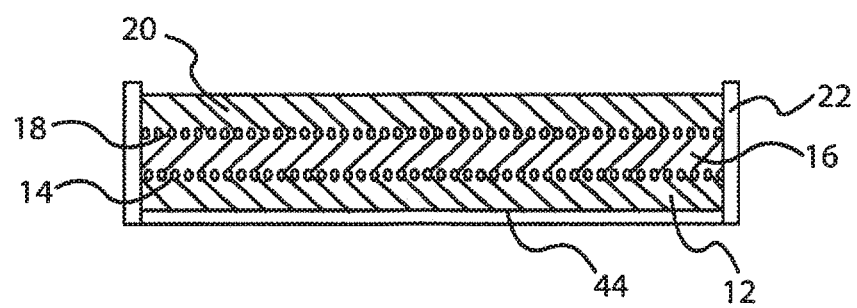
FIG. 6 a cross sectional view of an artificial stone building tile of the disclosed technology, showing the tile in the mold.

FIG. 6 shows the mold 22 fully assembled with the ingredients to make a 5 layer tile. The 5 layers of this tile include a color layer 12, a metal mesh 14, a backing layer 16, a second metal mesh 18, and a second backing layer 20. A slab with more layers is also possible. When the material is cured, the mold is turned upside down and the cured tile drops out of the mold. The first face of the color layer which is designated 44 will have whatever colors were selected and will face outward from the wall to which it is attached.

The resulting slab is sufficiently rigid to allow installation on a ceiling without the slab becoming dislodged by its own weight. The slab or tile created by this technology has significant flexibility, and a four foot long section of slab has the ability to flex 1 ¼ to 1½ inches. It has a density of approximately 4 pounds per square foot. The flexibility allows a slab of this technology to be precast or stretched into a semi-round slab or a semi-spherical slab without cracking. The slab thus formed is also hard enough to be polished like real stone, and has a Mohs hardness about the same as marble.

Figure 7:
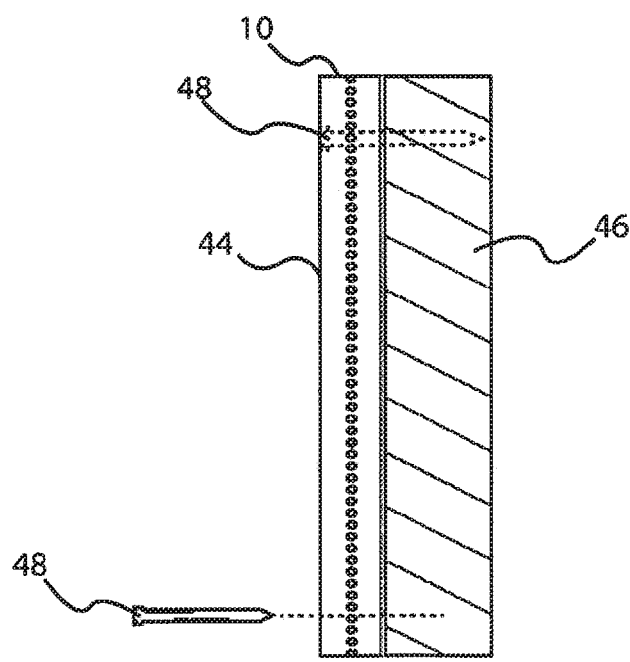
FIG. 7 is a side view showing the steps of method of making and installing the artificial stone building tile of the disclosed technology.

FIG. 7 shows an additional step in the installation of a slab of this technology which includes an artificial stone construction material 10 which is attached to the wall of a building 46, by use of nails 48, with the facing side 44 available for polishing. Typically the nails would be finish nails without a head and could be slightly counter sunk, with the nail holes patched with a colored cement paste which matches the surface of the color layer 44.

Figure 8:
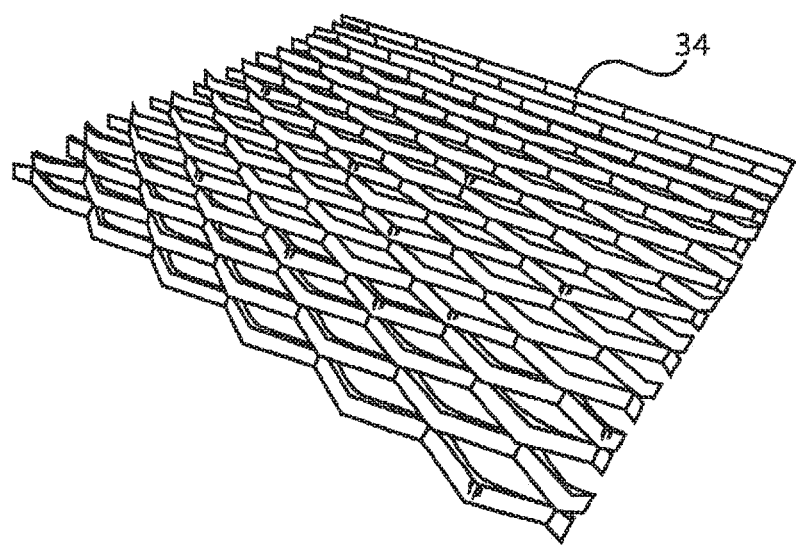
FIG. 8 is a perspective view showing the expanded metal mesh of the artificial stone building tile of the disclosed technology.

Shown in FIG. 8 is a square of expanded metal mesh 34, which preferably is expanded aluminum with gaps approximately ¼ inch from edge to edge. Other types of metal mesh can also be used, such as woven wire meshes.

The artificial stone is made in slabs which are 24 inches-.times.24 inches or in larger dimensions. The minimum thickness is ½ inch and can be thicker than ½ inch, such as ¾ inch, 1 inch, 2 inch and thicker. In larger thicknesses, the structure of a 1½ inch layer is repeated multiple times.

The method involves using a mold or form which has a bottom surface and 4 sides, and is open on the top. What is poured into the bottom of the form will become the visible surface of a slab of artificial stone. One way to make a slab that has the appearance of real stone is to lay down the first layer of material with several different formulations, which each dry with different texture and color. These formulations are all based on a mixture of cement, but may be water based or oil based, to achieve a different surface texture and color.

The different textures and colors combine to create a product which has the appearance of real stone. The first layer placed into the form can have multiple formulations, and is poured to a depth of about ¼ inch. It is a cement formulation with water, and may include marble powder, chalk, or pumice powder, as examples. The preferred particle size of the powder is greater than 100, with a range of 100 to 200 being suitable. A particle size of 120 mesh is preferred. Colors in paste or powder can be added to this layer, or placed on the bottom of the mold to be picked up by the cement of the first layer.

There will be three layers of poured material in the mold in order to make ½ inch thick slab. Each of these layers will be separated by a layer of metal lath. After the first layer is poured to the preferred thickness, a sheet of metal lath is placed over the first layer. Metal lath is a type of expanded metal mesh, made of aluminum, and has a generally diamond or rhomboid shaped hole. It is made by slitting and stretching a sheet of metal to form the mesh. A preferred type of metal lath is that made by AMICO which is a flat diamond mesh lath. Other types and brands of metal mesh would also work. One purpose of the metal mesh is to prevent the first layer of color and powder plus cement from being diluted with layers of materials that are applied later.

Over the layer of metal lath, another layer of cement formulation is placed, and smoothed out to a level surface. This material of the second and subsequent layers will not be visible when installed, so it can be made of one formulation of cement material. On top of that layer, while the 2.sup.nd layer is still wet and has not cured, a second layer of metal mesh is placed. The metal mesh is placed so that the holes on the two different layers of metal mesh do not line up. This can be accomplished by having the different layers of metal mesh turned 90 degrees to each other, or by moving the metal mesh to one side so that the holes do not line up.

A third layer of cement material in then placed over the top of the second layer of metal lath, and the three layers of cement and the two layers of metal lath are allowed to dry.

The slab thus created is removed from the mold, and has the characteristic that it can be nailed to a wall. It can be nailed into plywood, or preferably into a stud in a wall. This material has the characteristic that is can have the appearance of natural stone, has a certain amount of flex but will not crack, and returns to its resting shape. For instance, a sheet approximately 4 feet long and 4 inches tall, can flex approximately ¼ inch in the middle without cracking, and will return to its original shape.

Materials that can be used in the various layers of cement formulation can include White cement, pumice, glue, pigment layers, crushed granite, crushed limestone, crushed crystals, or crushed stones. All of these can be held together in a matrix of cement, which can be an oil based or water based cement.

A large slab of this material can be made and cut into smaller squares. The material is made in a horizontal orientation and when finished can be nailed in a vertical position. The nailing process does not crack the material, and the weight is much lighter than real stone, and the surface appearance is that of natural stone.

Figure 9:
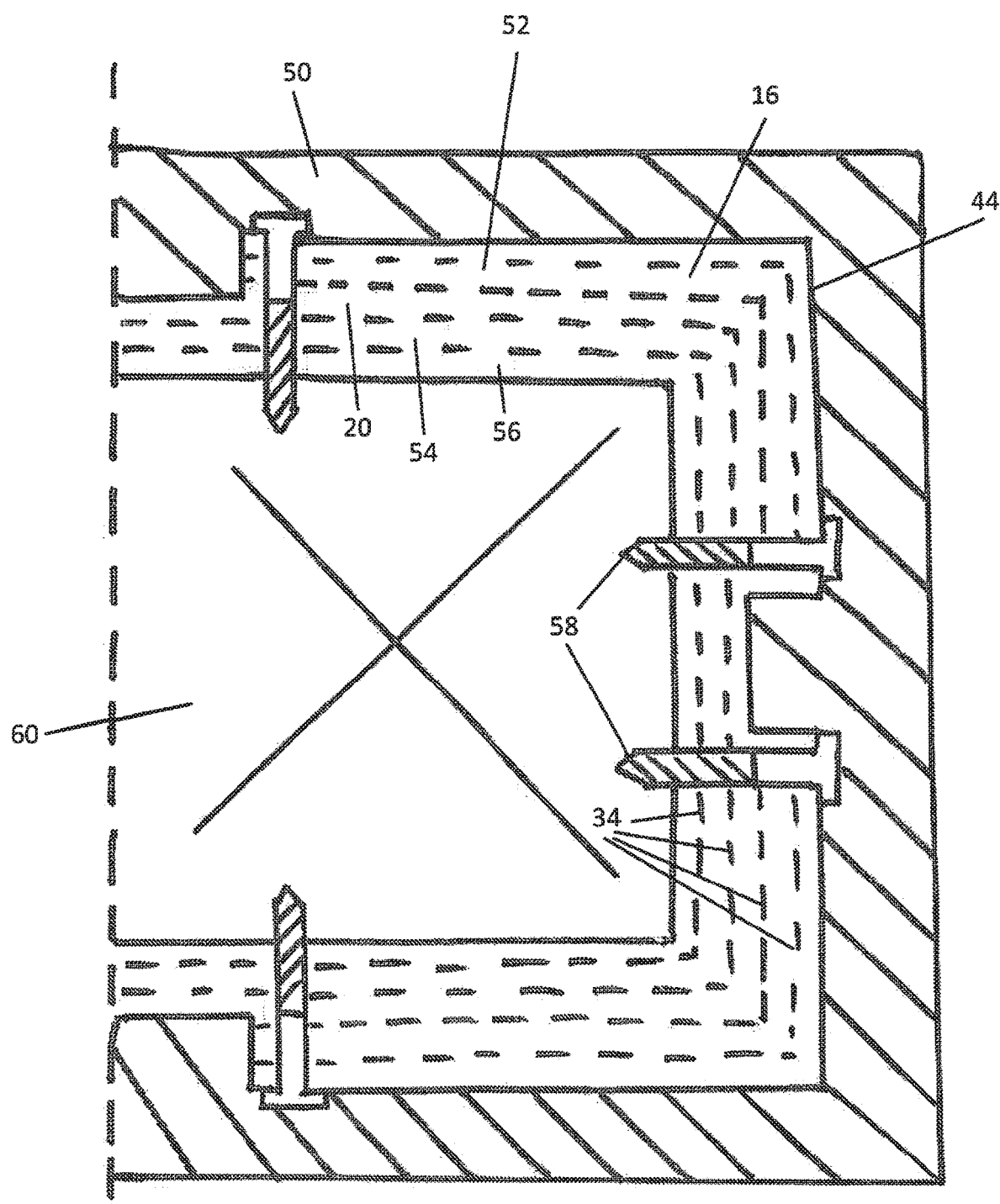
FIG. 9 is a top view of a cross section of a trim piece surrounding a column.

Shown in FIG. 9 is a top view is a cross section of the disclosed technology used as a three sided trim piece or collar used to surround a vertical column on three sides. A form 50 is created which will define the exterior shape of the trim piece. The trim piece 52 will fit around a column which in this case is shown as a square column.

A first layer of color material 12 is placed in the interior sides of the form 50. The color layer 12 is equivalent to the color layer 12 of a slab type material. It has the same constituents but is mixed with water to the consistency of plaster, so that is sticks to the vertical inner sides of the form 50. A first layer 12 is applied, then a layer of wire mesh 34 is applied. A first backing layer 16 is formed on top of the wire mesh 34, in the interior of the form 50. The second backing layer typically would have the stone powder portion of the ingredients to also include larger pieces of the stone, such as ⅛ inch. The stone powder portion would thus be 50% fine powdered stone powder and 50% larger pieces of ⅛ inch. Each of the backing layers would be separated by a layer of metal mesh 34.

The second backing layer 20 would be made up of 20% fine stone powder, 40% ⅛" aggregate, and 40% ¼ inch aggregate.

The third backing layer 54 would be made up of 20% ⅛ inch particles, 40% ¼ inch pieces, and 40% ⅜ inch particles of stone.

The fourth backing layer 56 would be 10% ⅛ inch stone pieces, 30% ¼ inch aggregate, 30% ⅜ inch aggregate, and 30% ½ inch aggregate. Each layer would be separated by a layer of metal mesh 34.

Attaching screws or bolts 58 would be embedded in the trim piece 52 as the layers are built up. The interior of the trim would be shaped to fit a particular column, such as by use of a place holding form insert 60. When removed from the form, the face surface 44 first layer can be sanded with 350 grit sandpaper to achieve a polished surface similar to polished stone, yet retain light weight. Although hard enough to be polished like marble, it can be nailed without cracking.

Figure 10:
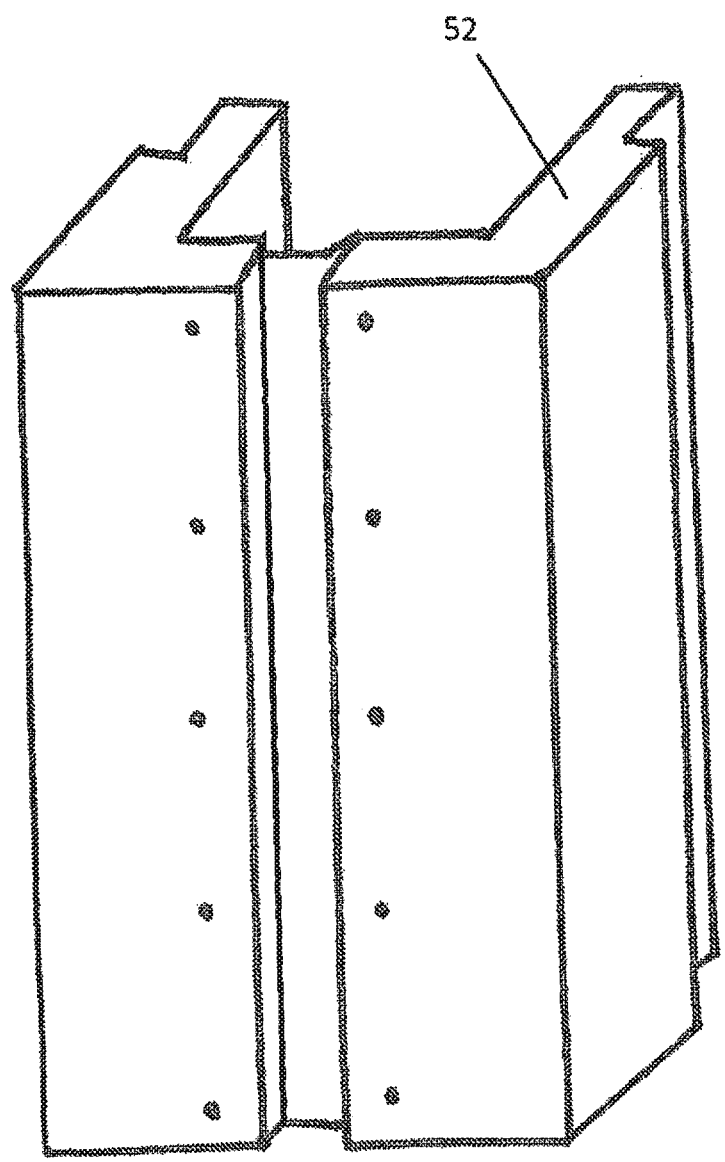
FIG. 10 is a perspective view of a trim piece for installation on a column.

FIG. 10 shows the trim piece 52 after it has been removed from the mold 50.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. An artificial stone building slab comprising:
a color layer made up of at least one colored cement mix, comprised of stone powder, cement, pigment and a glue, the color layer configured for placement on a vertical wall surface facing away from the vertical wall surface;
a metal mesh layer embedded between the color layer and a backing layer;
the backing layer adjacent to the metal mesh layer, configured for placement against the vertical wall and made up of a stone mix comprised of half stone powder and half stone pieces less than ⅛ inch in size; and
with the artificial stone building slab having flexibility to allow at least 1¼ inches of flex in a 48-inch piece, and a density of approximately 4 pounds per square foot, and a hardness of greater than Mohs 3 to allow sanding of the slab, and the slab being sufficiently resilient to allow nailing without cracking.

2. The artificial stone building slab of claim 1 in which the color layer is comprised of 45 units of stone powder and 25 units of cement.

3. The artificial stone building slab of claim 1 in which the stone powder is selected from the group consisting of marble powder, granite powder, pumice powder, quartz powder, and chalk.

4. The artificial stone building slab of claim 1 which further comprises a second metal mesh layer against the backing layer, and a second backing layer over the second metal mesh layer.

5. An artificial stone comprising:
a color layer comprising a stone powder, a cement, a pigment and a glue, the stone powder of the color layer having a particle size less than or equal to 200 mesh;
one or more backing layers including a first backing layer, each of the one or more backing layers comprising stone pieces, a cement, and a glue; and
one or more layers of metal mesh including a first metal mesh layer embedded between the color layer and the first backing layer,
wherein the artificial stone has a flexibility of greater than 1¼ inch of flex per 48 inches, and a density of approximately 4 pounds per square foot, and a Mohs hardness of 3-4.

6. The artificial stone of claim 5, wherein the color layer comprises a plurality of pigments.

7. The artificial stone of claim 6, wherein the color layer is approximately ¼ inch thick and the first backing layer is approximately ¼ inch thick.

8. The artificial stone of claim 7, wherein the stone pieces are approximately ⅛ inch in size.

9. The artificial stone of claim 5, wherein a ratio of stone powder to cement in the color layer is in a range of 40:30-50:20 by weight.

10. The artificial stone of claim 5, wherein the one or more layers of metal mesh is a plurality of metal mesh layers and the one or more backing layers is a plurality of backing layers, one of the plurality of metal mesh layers being the first metal mesh layer embedded between the color layer and the first backing layer, the others of the plurality of metal mesh layers each being embedded between adjacent backing layers of the plurality of backing layers.

11. The artificial stone of claim 10, wherein adjacent metal mesh layers of the plurality of metal mesh layers are angularly offset from each other by 90 degrees.

12. The artificial stone of claim 11, wherein at least one of the plurality of metal mesh layers is a layer of metal lath.

13. The artificial stone of claim 10, wherein the plurality of backing layers includes a second backing layer, the stone pieces of the second backing layer including stone pieces larger in size than the stone pieces of the first backing layer.

14. The artificial stone of claim 5, wherein the stone powder of the color layer comprises one or more powders selected from the group consisting of marble powder, granite powder, pumice powder, quartz powder, and chalk.

15. The artificial stone of claim 5, wherein the artificial stone is mounted on a vertical surface by nails and an adhesive.

16. The artificial stone of claim 15, wherein the artificial stone is a trim piece and the vertical surface is a column, the trim piece surrounding the column.

17. The artificial stone of claim 5, wherein the artificial stone is mounted on a horizontal surface.

18. The artificial stone of claim 5, wherein the stone powder of the color layer having a particle size between 100 mesh and 200 mesh.

19. An artificial stone comprising:
a color layer comprising a stone powder, a cement, a pigment and a glue, the stone powder of the color layer having a particle size less than or equal to 200 mesh;
one or more backing layers including a first backing layer, each of the one or more backing layers comprising stone pieces, a cement, and a glue; and
one or more layers of metal mesh including a first metal mesh layer embedded between the color layer and the first backing layer,
wherein the one or more layers of metal mesh is a plurality of metal mesh layers and the one or more backing layers is a plurality of backing layers, one of the plurality of metal mesh layers being the first metal mesh layer embedded between the color layer and the first backing layer, the others of the plurality of metal mesh layers each being embedded between adjacent backing layers of the plurality of backing layers, wherein the plurality of backing layers includes a second backing layer, the stone pieces of the second backing layer including stone pieces larger in size than the stone pieces of the first backing layer, wherein the plurality of backing layers includes a third backing layer and a fourth backing layer, the stone pieces of the first backing layer comprising:
- approximately 50% stone powder having a particle size less than or equal to 200 mesh; and
- approximately 50% ⅛-inch stone pieces;

the stone pieces of the second backing layer comprising:
- approximately 20% stone powder having a particle size less than or equal to 200 mesh;
- approximately 40% ⅛-inch stone pieces; and
- approximately 40% ¼-inch stone pieces;

the stone pieces of the third backing layer comprising:
- approximately 20% ⅛-inch stone pieces;
- approximately 40% ¼-inch stone pieces; and
- approximately 40% ⅜-inch stone pieces; and the stone pieces of the fourth backing layer comprising:
- approximately 10% ⅛-inch stone pieces;
- approximately 30% ¼-inch stone pieces;
- approximately 30% ⅜-inch stone pieces; and
- approximately 30% ½-inch stone pieces.

* * * * *